2 Sheets—Sheet 1.
G. A. CONVERSE & J. B. BERNADOU.
APPARATUS FOR MAKING EXPLOSIVES.
No. 551,306. Patented Dec. 10, 1895.
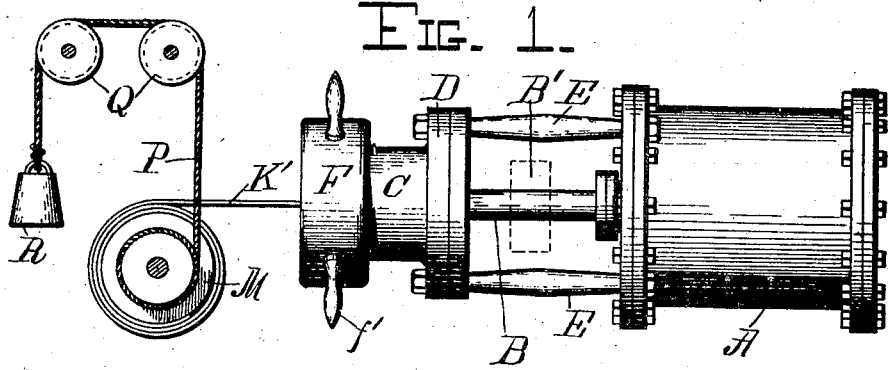
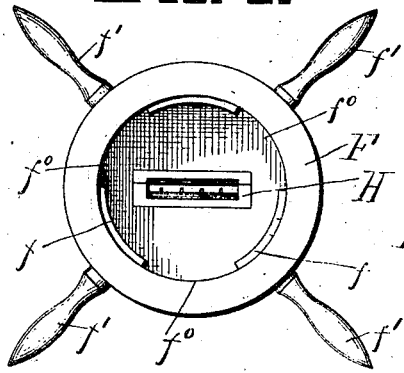
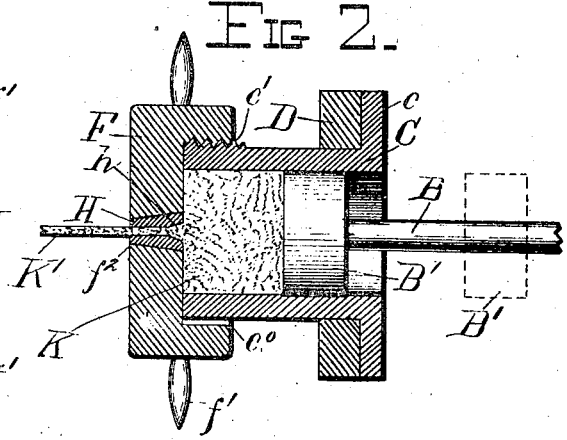
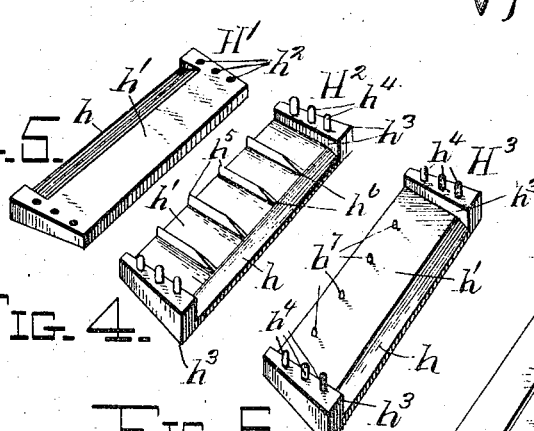
Witnesses
Percy C. Bowen
John H. Holt
Inventors
George A. Converse
John B. Bernadou
By Whitman & Wilkinson
Attorneys 2 Sheets—Sheet 2.
G. A. CONVERSE & J. B. BERNADOU.
APPARATUS FOR MAKING EXPLOSIVES.
No. 551,306. Patented Dec. 10, 1895.
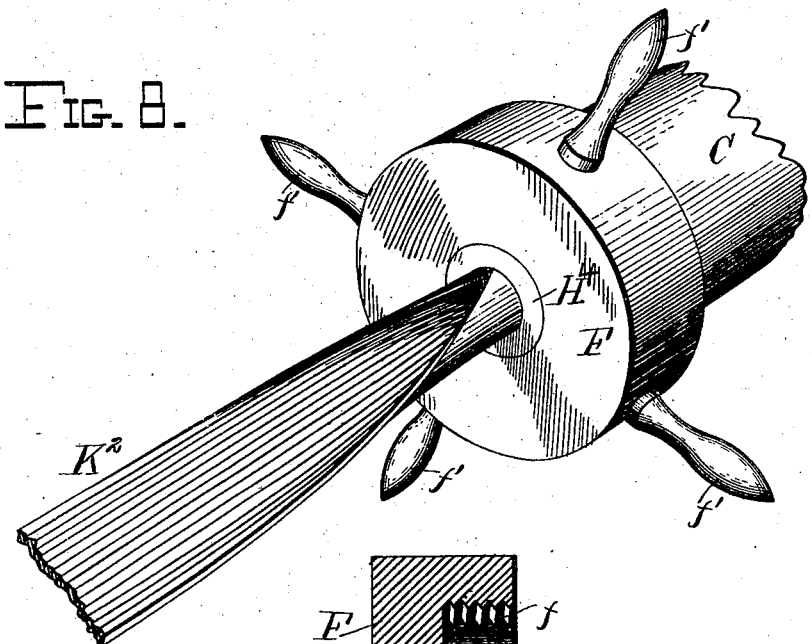
FIG. 8.
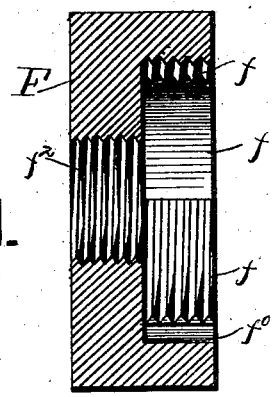
FIG. 9.
FIG. 10. FIG. 11. FIG. 12.
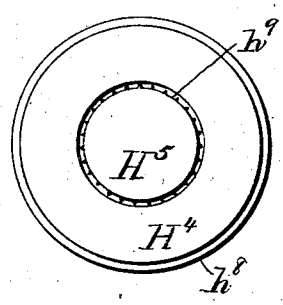 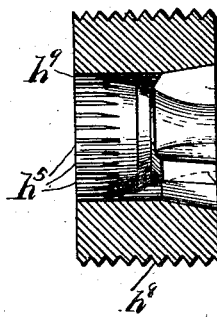 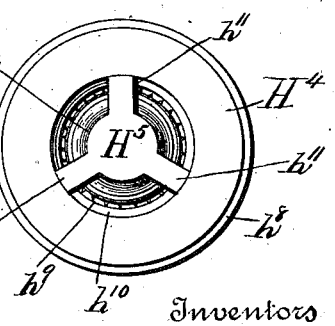
Witnesses
Percy C. Bowen
John H. Holt
Inventors
George A. Converse,
John B. Bernadou,
By Whitman & Wilkinson
Attorneys.

UNITED STATES PATENT OFFICE.

GEORGE A. CONVERSE AND JOHN B. BERNADOU, OF THE UNITED STATES NAVY.

APPARATUS FOR MAKING EXPLOSIVES.

SPECIFICATION forming part of Letters Patent No. 551,306, dated December 10, 1895.

Application filed September 19, 1895. Serial No. 563,025. (No model.)

*To all whom it may concern:*

Be it known that we, GEORGE A. CONVERSE, commander, United States Navy, and JOHN B. BERNADOU, lieutenant, United States Navy, stationed at United States Torpedo Station, in the city of Newport and State of Rhode Island, have invented certain new and useful Improvements in Apparatus for Separating Plastic Powder into Sheets or Strips; and we do hereby declare the following to be a full, clear, and exact description of the invention, such as will enable others skilled in the art to which it appertains to make and use the same.

Our invention relates to improvements in apparatus for the manufacture of masses of regular forms of uniform least dimension, generally inaccurately termed "grains," from explosives while in the plastic stage, and it is especially intended to provide for the manufacture of uniform sheets or plates from nitro-cellulose or like nitro-substitution powders, while the said powder is in the plastic state.

The said invention will be understood by reference to the accompanying drawings in which the same parts are indicated by the same letters throughout the several views.

Figure 1 represents a side elevation of the apparatus for forming the plastic powder into a continuous strip or tape of ribbed material. Fig. 2 represents a vertical section through the compression-cylinder and showing the die in cross-section. Fig. 3 represents an interior view of the detachable head for the compression-cylinder which carries the die. Fig. 4 represents one of the parts of the die, and Fig. 5 the opposite part which unites therewith to form the whole die. Fig. 6 represents a modification of the device shown in Fig. 4, in which the indenting knives or ribs are replaced by simple sharp teeth. Fig. 7 represents a perspective view of a piece of the plastic tape before it is cut up. Fig. 8 represents a perspective view of a modified form of die with the cylinder-head inclosing the same, the die being in this case annular in shape. Fig. 9 represents a transverse section through the cylinder-head before the die has been screwed into place. Fig. 10 represents an enlarged front view of the annular die. Fig. 11 represents a central vertical section through the device shown in Fig. 10, and Fig. 12 represents a rear view of the die shown in Figs. 10 and 11.

A represents a hydraulic cylinder having a piston-rod B, terminating in a piston B' which engages in the compression-cylinder C, which cylinder is flanged as at $c$, and is held in position by the ring D, abutting against said flanges, and the tie-rods E connecting the same to the steam-cylinder A. This cylinder C is open at both ends, and when in use is closed at the rear end by the piston B', and at the outer end by the detachable head F carrying the die. This head is provided with interrupted screw-threads $f$, with alternate grooves $f^0$ between the same, which screw-threads and grooves register with corresponding grooves and screw-threads $c^0$ and $c'$ on the exterior of the cylinder C, as shown in Fig. 2. By having these interrupted screw-threads divided up into three or more portions, it will only be necessary to turn the head F through a small angle in order to detach the same from the cylinder C. This is desirable because the die frequently becomes choked or clogged, and it becomes necessary to take off the head F in order to clean the same. In order to provide for unscrewing or screwing up the head F, handles $f'$ are provided. This head F is recessed at or near the center thereof to receive the die H, which is preferably made in two detachable portions, as shown in Figs. 4, 5, and 6. Each of these portions is provided with an inwardly-flaring lip $h$ terminating in the flat face $h'$, which faces are spaced apart the requisite distance, in order to obtain the desired thickness of the tape, of plastic material, by means of the vertical shoulders $h^3$, which terminate in the holding-pins $h^4$, adapted to engage in corresponding indentations $h^2$ of the opposite member H'. On the interior of the member H² inwardly-projecting knives $h^5$ are provided, sloping, as shown at $h^6$, to allow the free passage of the plastic material into the channel through the die. Instead of these knives, simple teeth $h^7$, such as are shown on the member H³ in Fig. 6, may be provided. The function of these knives or teeth is to form longitudinal indentations or grooves in one side of the tape or strip K' as it is pressed out through the die, which grooves are shown at $k$ in Fig. 7. The principal function of these grooves is to furnish passages for the flame along the entire length of the strips which make up the charge in the gun, and thus to give a uniform combustion in the direction of the least dimension. These grooves divide the sheet into a plurality of longitudinal strips $k'$, each connected together by a reduced portion of the main strip, and thus the sheet is given a tendency to break longitudinally instead of transversely, when subjected to breaking strains, and so to leave longitudinal open passages for the flame. This is of special importance, since the material when dried is very frangible, and it is desirable to make the separate sheets that constitute the charge for a gun (which sheets are ordinarily miscalled "grains") of uniform length and of uniform least dimension.

K' represents the sheet of plastic material K, which is squeezed through the die by the pressure on the piston B'. This plastic sheet K' is rolled on a drum M, and in order to prevent the parts from adhering a little oil may be applied to the surface of the said sheet or tape; but this is not absolutely necessary, as the plastic material hardens and dries enough upon exposure to the open air not to stick to the layers beneath. Since the tape is still plastic after leaving the die, it is important that a uniform tension should be put on the same in winding it upon the drum, so that the tape may be always stretched a uniform amount. This is accomplished by putting any constant force at work in rotating the drum—such, for instance, as by the cord P, passing over the pulleys Q and having the suspended weight R attached thereto.

In the modified form of die shown in Figs. 8 to 12, $H^4$ represents a ring screw-threaded externally, as at $h^8$, and screwing into the screw-threaded aperture $f^2$ in the head F. This ring has an opening $h^9$, which opening terminates in a rearwardly-opening recess $h^{10}$ in the form of a frustum of a cone, into which conical portion fit the tapering ribs $h^{11}$ of the die-block $H^5$. The rear portion of this die-block is reduced as at $h^{12}$ to allow the free passage from the rear of the plastic material, while the die-block becomes cylindrical in exterior section near its forward end, which cylindrical portion is concentric with the openings $h^9$ in the ring $H^4$. There is thus an annular groove between the block $H^5$ and the ring $H^4$ through which the plastic material is pressed.

In order to give the longitudinal groove in the finished product, knives $h^5$, such as are shown in Figs. 4 and 11, or teeth $h^7$ are provided, such as are shown in Fig. 6. These teeth or knives may project either from the die-block outward or from the ring inward, as may be preferred, it being intended to groove the material on one side only.

The plastic material is squeezed in a tube-like form, with longitudinal grooves in the said tube, through the said die, and is then spread open longitudinally by a knife suitably placed, when the tube of plastic material may be flattened out into a sheet or tape $K^2$, as shown in Fig. 8, and may be wound upon a drum similar to that shown in Fig. 1, or otherwise disposed of as may be desired.

In practice the dies should be kept clean and well oiled.

After the plastic material is squeezed out through the die, and rolled up on the drum M, this drum is detached and the material while still plastic is fed to the chopping-machine where it is cut up into suitable lengths. The length into which the tape is cut up varies with the thickness of the sheet and the caliber of the gun, and is ordinarily from about 9.2 inches for six-pounder guns to about thirty-six inches for thirteen-inch guns. These separate sheets, miscalled "grains," are dried and bound in bundles of suitable shape, like fagots for kindling-wood, ready for firing in the gun. For powders of nitro-cellulose base the thickness, or at least dimension, of these sheets should be approximately one one-hundredth of the caliber of the gun for which the powder is intended.

We purpose to provide dies of various dimensions for the different calibers of guns for which the powder is intended.

It will be obvious that grooving knives or teeth may be provided to dent both sides of the tape of plastic material, and that they may be opposite each other, or interpenetrating, if desired.

In operation the plastic material is simply placed into the rear end of the cylinder C, the piston B' having been in the meantime withdrawn to the position shown in dotted lines in Figs. 1 and 2, and then the said piston is forced forward compressing the plastic material into the front end of the cylinder and squeezing it out through the die.

It will be obvious that various modifications of the herein-described apparatus might be made which could be used without departing from the spirit of our invention.

Having thus described our invention, what we claim, and desire to secure by Letters Patent of the United States, is—

1. In an apparatus for manufacturing a uniform strip from plastic material, the combination with a cylinder and a piston therein adapted to compress the plastic material in said cylinder, the said cylinder being provided with interrupted screw threads on the exterior thereof, of a detachable head provided with female screw threads also interrupted and adapted to engage in the male screw threads on the cylinder, and a die in said head through which the plastic material is pressed, substantially as described.

2. In an apparatus for manufacturing a uniform strip from plastic material, the combination with a cylinder or compression chamber, and a piston or plunger therein, adapted to compress the plastic material, of a head closing the end of said cylinder or compression chamber opposite said piston or plunger, a die mounted in said head and means for winding up the strips squeezed through said die, under a uniform tension, substantially as described.

3. In an apparatus for manufacturing a uniform strip from plastic material, the combination with a cylinder or compression chamber, and a piston or plunger therein, adapted to compress the plastic material, of a head closing the end of said cylinder, or compression chamber, opposite said piston or plunger, a die mounted in said head, a drum for winding up the strips squeezed through said die, and a suspended weight rotating said drum and causing a uniform tension to be exerted upon said strip, substantially as described.

4. In an apparatus for manufacturing a uniform grooved strip from plastic material, the combination with a cylinder, or compression chamber, and a piston or plunger therein, adapted to compress the plastic material, of a removable head closing the end of said cylinder or compression chamber, opposite said piston or plunger, a die mounted in said head and provided with a passage therethrough of essentially uniform depth, with projections from the said die extending part of the way into said passage, substantially as described.

5. A die for use in apparatus of the character described, consisting of two superimposed parts internally tapering as shown, and provided with an internal passage for the plastic material, with projections penetrating part of the way into said passage, substantially as described.

6. A die for use in apparatus of the character described, consisting of two superimposed parts with a passage between the parts of generally uniform depth, with parallel knives projecting part of the way into said passage, the ends of said knives that first engage the plastic material being made sloping as shown, substantially as described.

7. A die for use in apparatus of the character described consisting of two superimposed parts, internally tapering as shown, with a passage between the parts of generally uniform depth, with parallel knives projecting part of the way into said passage, the ends of said knives that first engage the plastic material being made sloping as shown, substantially as described.

8. A die composed of two superimposed parts adapted to fit together, with a rectangular passage between the same, with projections projecting part of the way into said passage, with an inwardly-flaring mouth on the side of said die through which the plastic material first passes, substantially as described.

In testimony whereof we affix our signatures in presence of two witnesses.

GEORGE A. CONVERSE.
JOHN B. BERNADOU.

Witnesses:
THOS. BRUP,
EDWARD W. MUIKLN.